United States Patent
Kang et al.

(10) Patent No.: US 7,330,738 B2
(45) Date of Patent: Feb. 12, 2008

(54) APPARATUS AND METHOD FOR CANCELING RESIDUAL ECHO IN A MOBILE TERMINAL OF A MOBILE COMMUNICATION SYSTEM

(75) Inventors: Sang-Ki Kang, Suwon-si (KR); Gang-Youl Kim, Suwon-si (KR); Jung-Soung Lee, Yongin-si (KR); Hyun-Soo Kim, Yongin-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 598 days.

(21) Appl. No.: 11/008,138

(22) Filed: Dec. 10, 2004

(65) Prior Publication Data

US 2005/0130711 A1    Jun. 16, 2005

(30) Foreign Application Priority Data

Dec. 12, 2003    (KR)    ............ 10-2003-0090864

(51) Int. Cl.
*H04B 1/38*    (2006.01)
*H04M 1/00*    (2006.01)

(52) U.S. Cl. ............ 455/570; 704/207; 704/226; 704/227; 704/228; 704/229; 379/406.01; 379/406.03; 379/406.08

(58) Field of Classification Search ............ 455/570, 455/63.1, 67.13; 704/207, 226–229; 379/406.01–406.16
See application file for complete search history.

(56) References Cited

U.S. PATENT DOCUMENTS

| | | | |
|---|---|---|---|
| 5,193,112 A * | 3/1993 | Sano ............ | 379/406.08 |
| 6,272,106 B1 * | 8/2001 | Kawahara et al. ............ | 370/201 |
| 6,526,140 B1 * | 2/2003 | Marchok et al. ............ | 379/406.03 |
| 6,804,203 B1 * | 10/2004 | Benyassine et al. ............ | 370/286 |
| 2003/0023430 A1 * | 1/2003 | Wang et al. ............ | 704/226 |
| 2004/0151303 A1 * | 8/2004 | Park et al. ............ | 379/406.01 |

OTHER PUBLICATIONS

Hae Kyung Jung et al., "A New Double-Talk Detector Using Echo Path Estimation", IEEE, Sep. 2002.

* cited by examiner

*Primary Examiner*—Lewis West
*Assistant Examiner*—Sujatha Sharma
(74) *Attorney, Agent, or Firm*—Roylance, Abrams, Berdo & Goodman, LLP

(57) ABSTRACT

An apparatus for canceling an echo signal in a mobile terminal of a mobile communication system. A double talk detector (DTD) receives a first signal by canceling an estimated echo signal from a signal received through a microphone, outputs the first signal, and outputs the first and a second signal comprising a background noise signal and a residual echo signal during a non-double talk. An Auto-Regressive (AR) analysis and inverse filtering unit receives the second signal from the DTD, and whitens the second signal. A pitch analysis and inverse filtering unit receives the whitened signal, and cancels a pitch value remaining therein by performing pitch analysis and inverse filtering on the whitened signal. A noise canceller receives the pitch-cancelled whitened signal and the first signal output from the DTD, canceling a residual echo signal and a background noise signal from the first signal using the pitch-cancelled whitened signal.

9 Claims, 3 Drawing Sheets

APPARATUS AND METHOD FOR CANCELING RESIDUAL ECHO IN A MOBILE TERMINAL OF A MOBILE COMMUNICATION SYSTEM

PRIORITY

This application claims the benefit under 35 U.S.C. §119 (a) of an application entitled "Apparatus and Method for Canceling Residual Echo in a Mobile Terminal of a Mobile Communication System" filed in the Korean Intellectual Property Office on Dec. 12, 2003 and assigned Serial No. 2003-90864, the entire contents of which are incorporated herein by reference.

BACKGROUND OF THE INVENTION

1. Field of the Invention

The present invention relates generally to an apparatus and method for canceling an echo signal in a mobile communication system. In particular, the present invention relates to an apparatus and method for canceling an echo signal in a mobile terminal of a mobile communication system.

2. Description of the Related Art

In general, a mobile communication system transmits voice signals with a predetermined frequency band in order to provide mobility for a mobile terminal. Such a mobile terminal of the mobile communication system transmits voice signals in many different environments. For example, the mobile terminal can serve as a telephone in a home or an office, and can enable a voice call in an automobile or a subway. When the mobile terminal (also known as a mobile communication terminal and a voice communication terminal) performs a call in a teleconferencing mode or a normal call mode, an acoustic echo signal and noise having different paths are input into its microphone. An increase in the strength of the acoustic echo signal causes a howling phenomenon, which decreases the call quality. Therefore, the mobile terminal includes an echo canceller in order to cancel the acoustic echo signal. The acoustic echo signal is generated as a voice signal of the other party in the conversation with a person talking on the mobile terminal. The generated signal is fed back to a microphone through a speaker. In the following description, the other party will be referred to as a "remote talker" and the person talking on the mobile terminal will be referred to as a "local talker."

Any background noise also serves as another major cause of reduced speech quality in a voice call. The background noise refers to the day-to-day environmental noise, such as traffic, wind noise, television and other people talking. The background noise, unless cancelled out, causes call quality to deteriorate by creating noise, like the echo signal. In order to cancel the background noise as well as the echo signal, much research has been and continues to be conducted.

Now, with reference to FIG. 1, a description will be made of a structure and operation of an echo canceling apparatus used in a mobile terminal.

FIG. 1 is a block diagram illustrating a structure of an echo canceling apparatus used in a conventional mobile terminal. Referring to FIG. 1, a remote talker's signal (hereinafter referred to as a "remote-talker signal") x(k) means a signal, which is converted into an electric voice signal after being decoded. The remote-talker signal is converted into an audible signal through a speaker 110. Also, the remote-talker signal x(k) is input to an echo canceller 130. The echo canceller 130 generates an estimated echo signal ŷ(k) using an error signal e(k) which will be described later in more detail below. A local talker's signal (hereinafter referred to as a "local-talker signal") s(k) and a background noise n(k) are input to a microphone 120. In addition, an echo signal y(k) described above is input to the microphone 120. The echo signal y(k) is derived from the remote-talker signal x(k) through the speaker 110, and is input to the microphone 120. Therefore, the echo signal y(k) is input to the microphone after a time delay. Because the echo signal y(k) is output through the speaker 110, it is a distorted signal of the remote-talker signal x(k).

When the local-talker signal s(x), the background noise n(k) and the echo signal y(k) are input to the microphone 120, the microphone 120 converts the input signals into an electric signal d(k). An adder 140 is used to cancel the echo signal y(k) from the electric signal d(k). The adder 140 cancels the estimated echo signal ŷ(k) output from the echo canceller 130 from the electric signal d(k). That is, the adder 140 outputs a difference between the electric signal d(k) and the estimated echo signal ŷ(k). The difference signal is called an error signal e(k). The error signal e(k) can be defined as $$e(k) = s(k) + n(k) + y(k) - \hat{y}(k) \qquad \text{Equation (1)}$$
$$= s(k) + n(k) + r(k), \text{ where}$$
$$r(k) = y(k) - \hat{y}(k)$$

It can be understood from Equation (1) that as r(k) is smaller, the echo canceller 130 has better performance. In the following description, the r(k) will be referred to as a "residual echo signal." The echo signal e(k) of Equation (1) including the residual echo signal r(k) is input to a noise canceller 150, and the noise canceller 150 outputs a noise-cancelled local-talker signal ŝ(k). The noise canceller 150 cancels the background noise n(k) and the residual echo signal r(k) from the electric signal d(k).

A description will now be made of a general noise cancellation technique performed in the noise canceller 150. The general noise cancellation technique cancels the background noise n(k) on the following assumptions.

Assumption 1: The background noise n(k) is a wise sense stationary (WSS) signal.

Assumption 2: The background noise n(k) varies with the passage of time.

On the foregoing assumptions, the background noise n(k) can be cancelled as follows. When a voice signal is mixed with a time-varying white nose or color noise, it is possible to obtain a clean voice signal by estimating and canceling only the noise. Therefore, when the residual echo signal r(k) is a white or color noise having a WSS characteristic like the background noise n(k), it can be cancelled using background noise estimation. However, when a source of the echo signal y(k) is a voice signal, the residual echo signal r(k) generated as an output of the echo canceller 130 has a characteristic of a voice signal. Therefore, a voice activity detector (VAD) included in the noise canceller 150 mistakes the residual echo signal r(k) for a voice signal.

A method recently proposed to more accurately cancel the residual echo signal r(k) whitens the residual echo signal r(k) into a pseudo-white noise through inverse filtering for which coefficients obtained through Auto-Regressive (AR) analysis of a residual echo are used, thereby maximizing the effect of the noise canceller arranged in the following stage.

A description will now be made of the recently proposed method for canceling noise through AR analysis.

The method for whitening the residual echo signal r(k) into a pseudo-white nose through AR analysis before noise cancellation determines whether there is a local-talker signal s(k), and arranges an AR coefficient-based inverse filter at a following stage of a double talk detector (DTD). An error signal e(k) free of a local-talker signal s(k) is sent to the AR analysis and inverse filtering part where its AR coefficient is estimated. Thereafter, the method performs inverse filtering on the estimated AR coefficient, generating a whitened signal $w_e(k)=w_n(k)+w_r(k)$, and sends the whitened signal $w_e(k)$ to the noise canceller. In this manner, the method cancels the residual echo signal together with the background noise.

However, when the remote-talker signal s(k) is a voice signal, the residual echo signal r(k) also has a characteristic of a voice signal. Therefore, a solution for inverse filtering can be approximated with a $p^{th}$-order AR model in accordance with Equation (2).

$$w_r(k) = -\sum_{i=0}^{P} \hat{a}(i)r(k - i), \text{ where } \hat{a}(0) = 1 \quad \text{Equation (2)}$$

In Equation (2), $\hat{a}(i)$ denotes an estimated AR coefficient, $w_r(k)$ denotes a whitened signal of r(k), and $w_n(k)$ denotes a whitened signal of n(k).

The AR analysis-based inverse filtering method whitens a residual echo signal into a white noise signal, regarding it as a voice signal, and mixes the white noise with a background noise transmitted through a microphone so that the noise canceller cancels the white noise. However, although the residual echo signal is actually subject to inverse filtering using AR analysis, a periodic component such as a voiced sound remains uncancelled. Because the periodic component like the voiced sound, which is a pitch component, occurs at stated periods, it cannot be completely whitened, thereby causing deterioration in the quality of the call.

SUMMARY OF THE INVENTION

It is, therefore, an object of the present invention to provide an apparatus and method for canceling a voiced sound using Auto-Regressive (AR) analysis, thereby improving call quality.

It is another object of the present invention to provide an apparatus and method for minimizing a residual noise signal, thereby preventing a talker from being bothered by excessive noise during a call.

To achieve the above and other objects, there is provided an apparatus for canceling an echo signal in a mobile terminal of a mobile communication system. The apparatus comprises a double talk detector (DTD) for receiving an error signal including a background noise signal and a residual echo signal as a first signal, outputting the first signal as it is during a double talk, and outputting the first signal and a second signal made up of a background noise signal and a residual echo signal during a non-double talk; an Auto-Regressive (AR) analysis and inverse filtering unit for receiving the second signal from the DTD, and whitening the second signal; a pitch analysis and inverse filtering unit for receiving the whitened signal, and canceling a pitch value remaining therein by performing pitch analysis and inverse filtering on the whitened signal; and a noise canceller for receiving the pitch-cancelled whitened signal and the first signal output from the DTD, and canceling a residual echo signal and a background noise signal from the first signal using the pitch-cancelled whitened signal.

To achieve the above and other objects, there is provided a method for canceling an echo signal in a mobile terminal of a mobile communication system. The method comprises the steps of whitening a second signal made up of a background noise signal and a residual echo signal in a first signal including a background noise signal and a residual echo signal; performing pitch analysis and inverse filtering on the whitened signal, calculating a pitch value remaining in the whitened signal, and canceling the pitch value from the whitened signal; and canceling a residual echo signal and a background noise signal from the first signal using the pitch-cancelled whitened signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
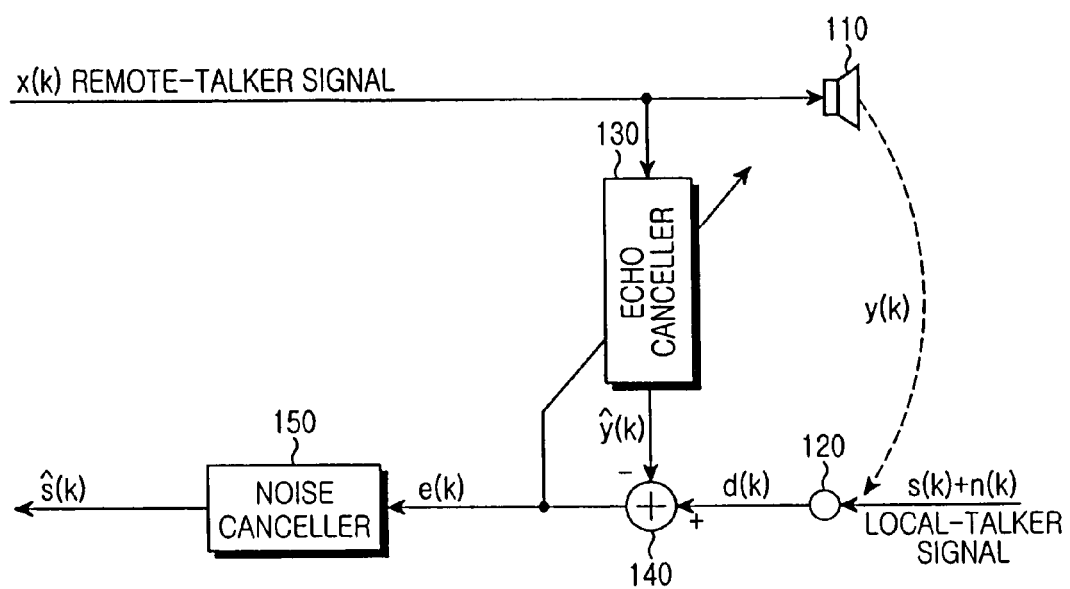
FIG. 1 is a block diagram illustrating a structure of an echo canceling apparatus used in a conventional mobile terminal.

A preferred embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Figure 2:
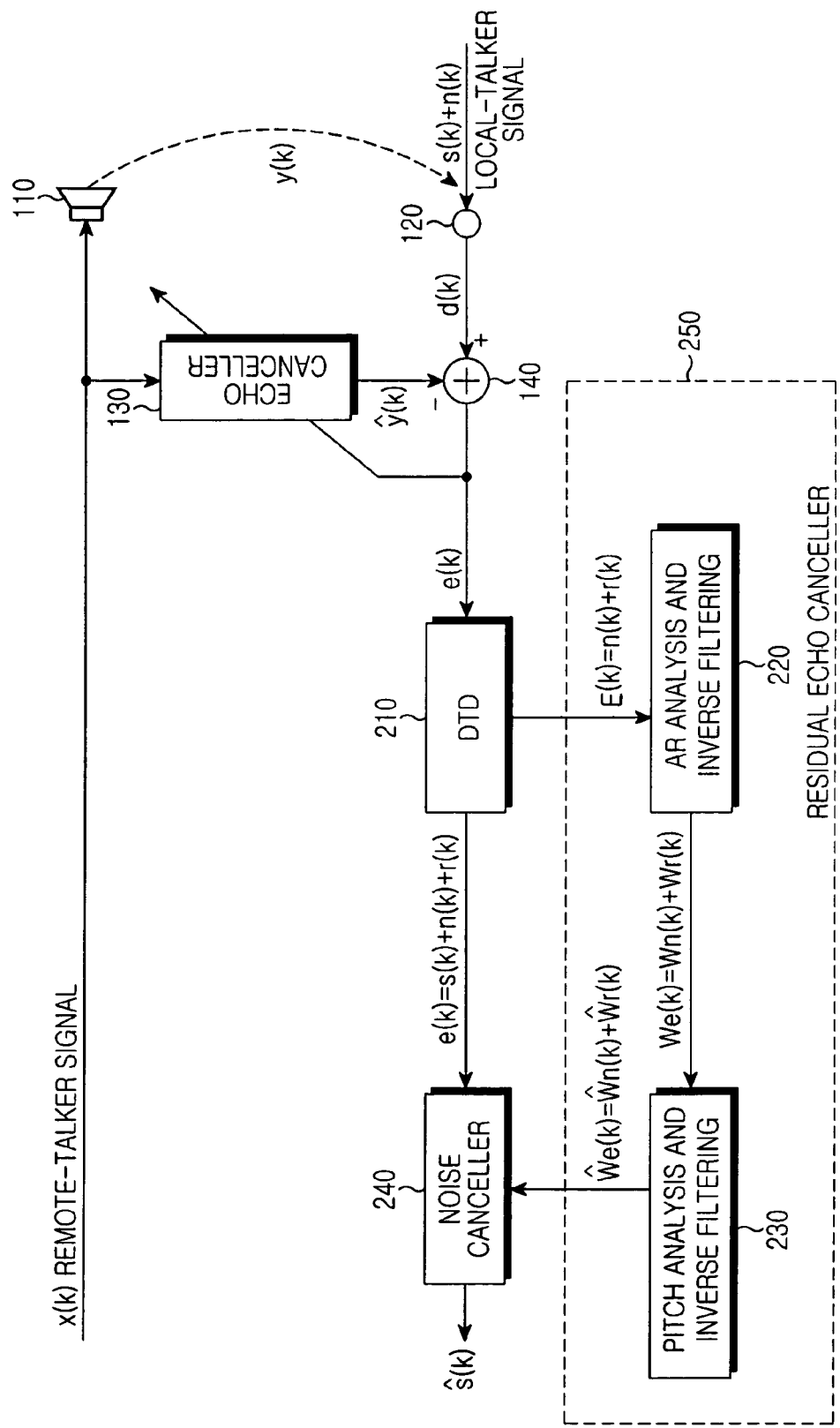
FIG. 2 is a block diagram illustrating a structure of an echo canceling apparatus according to an embodiment of the present invention.

FIG. 2 is a block diagram illustrating a structure of an echo canceling apparatus according to an embodiment of the present invention. With reference to FIG. 2, a detailed description will be made of a structure and operation of an echo canceling apparatus according to an embodiment of the present invention.

Referring to FIG. 2, a speaker 110 for reproducing a remote-talker signal x(k), an echo canceller 130 for generating an estimated echo signal ŷ(k) using an error signal e(k) from the remote-talker signal x(k), an adder 140, and a microphone 120 for receiving a local-talker signal s(k) and a background noise n(k) are equal in structure and operation to the corresponding elements illustrated in FIG. 1. Therefore, another description thereof will not be given for the sake of simplicity. The error signal e(k) output from the adder 140, which was described in connection with FIG. 1, is input into a double talk detector (DTD) 210 according to an embodiment of the present invention. The DTD 210 detects a double talk using cross correlation. The double talk refers to a situation where a remote talker and a local talker are talking at the same time. The DTD 210 has two output terminals: a first output terminal, which is connected to a noise canceller 240, and a second output terminal, which is connected to a residual echo canceller 250. The DTD 210 outputs a signal as represented by Equation (1) from its first output terminal when it detects a double talk. The DTD 210 outputs a signal as represented by Equation (3) at its second output terminal only when it detects no double talk. Therefore, the first output terminal continuously outputs signals when double talk is present.

$$E(k)=n(k)+r(k) \quad \text{Equation (3)}$$

The signal output from the second output terminal of the DTD 210 is input to the residual echo canceller 250. The residual echo canceller 250 is comprised of an AR analysis and inverse filtering unit 220, and a pitch analysis and inverse filtering unit 230.

The AR analysis and inverse filtering unit 220 estimates an AR coefficient from the input signal, and obtains a whitened signal from the estimated AR coefficient by performing inverse filtering. The whitened signal output from the AR analysis and inverse filtering unit 220 can be expressed as $$w_e(k)=w_n(k)+w_r(k) \quad \text{Equation (4)}$$

In Equation (4), $w_e(k)$ denotes a sum of a whitened signal of the background noise $n(k)$ and a whitened signal of the residual echo signal $r(k)$, $w_n(k)$ denotes the whitened signal of the background noise $n(k)$, and $w_r(k)$ denotes the whitened signal of the residual echo signal $r(k)$.

The output of the AR analysis and inverse filtering unit 220 is input to the pitch analysis and inverse filtering unit 230. The pitch analysis and inverse filtering unit 230 analyzes a pitch value from the whitened signal of Equation (4), and cancels the pitch value remaining in the whitened residual echo signal by performing inverse filtering on the analyzed pitch value. The pitch analysis and inverse filtering process can be expressed as $$\hat{w}_r(k) = w_r(k) - \sum_{j=-i}^{I} \beta_j w_r(K-\tau-j) \quad \text{Equation (5)}$$

In Equation (5), $\hat{w}_r(k)$ denotes a signal obtained by canceling a pitch value from a whitened signal, $\beta$ denotes a pitch gain coefficient, $\tau$ denotes a period, and K denotes a time-domain sample.

Therefore, in Equation (5), if the value of 'I' is increased, a determinant should be calculated, causing an increase in the complexity of a formula for calculating $\beta$ and $\tau$ and a corresponding increase in calculation time and effort. If the value of 'I' is set to 1, the pitch gain coefficient $\beta$ can be calculated by $$\beta = \frac{\sum_{m=0}^{N-1} w_r(m)w_r(m-\tau)}{\sum_{m=0}^{N-1} w_r^2(m-\tau)}, \tau_{min} \le \tau \le \tau_{max} \quad \text{Equation (6)}$$

In Equation (6), N denotes the number of samples in one frame. To calculate the period $\tau$, it is necessary to select a value for minimizing a value of E defined as $$E = \sum_{m=0}^{N-1} w_r^2(m) - \frac{\left[\sum_{m=0}^{N-1} w_r(m)w_r(m-\tau)\right]^2}{\sum_{m=0}^{N-1} w_r^2(m-\tau)} \quad \text{Equation (7)}$$

The pitch analysis and inverse filtering unit 230 performs pitch analysis and inverse filtering from the values calculated using Equation (6) and Equation (7), and outputs the result. The pitch analysis and inverse filtering result can be expressed as $$\hat{W}_e(k)=\hat{W}_n(k)+\hat{W}_r(k) \quad \text{Equation (8)}$$

The calculated value is input to the noise canceller 240. Then the noise canceller 240 can cancel the background noise $n(k)$ and the residual echo signal $r(k)$ using the estimated background noise $\hat{W}_n(k)$ and the estimated residual echo signal $\hat{W}_r(k)$. As a result, the noise canceller 240 outputs a signal $\hat{s}(k)$ free of the background noise $n(k)$ and the residual echo signal $r(k)$ to a transmitter (not shown). In this manner, a mobile terminal completely cancels the noise signal and the echo signal before transmitting a voice signal, thereby improving the quality of a voice call.

In an alternative embodiment, the residual echo canceller 250 may not include the AR analysis and inverse filtering unit 220. In this case, the output of the DTD 210 is input to the pitch analysis and inverse filtering unit 230. That is, the signal input to the pitch analysis and inverse filtering unit 230 becomes the signal of Equation (3). The signal output from the DTD 210 becomes the residual echo signal $r(k)$ obtained by canceling an estimated echo signal $\hat{y}(k)$ from the background noise $n(k)$ and the echo signal $y(k)$. The pitch analysis and inverse filtering unit 230 performs inverse filtering on the pitch-analyzed value. In this alternative embodiment, the pitch analysis and inverse filtering process can be expressed as $$\hat{r}(k) = r(k) - \sum_{j=-i}^{I} \beta_j r(K-\tau-j) \quad \text{Equation (9)}$$

In Equation (9), $\hat{r}(k)$ denotes a signal obtained by canceling a pitch value from a residual echo signal, $\beta$ denotes a pitch gain coefficient, $\tau$ denotes a period, and K denotes a time-domain sample.

Therefore, in Equation (9), if the value of 'I' is increased, a determinant should be calculated as described above, causing an increase in complexity of a formula for calculating $\beta$ and $\tau$ and an increase in calculation. If the value of 'I' is set to 1, the pitch gain coefficient $\beta$ can be calculated by $$\beta = \frac{\sum_{m=0}^{N-1} r(m)r(m-\tau)}{\sum_{m=0}^{N-1} r^2(m-\tau)}, \tau_{min} \le \tau \le \tau_{max} \quad \text{Equation (10)}$$

In Equation (10), N denotes the number of samples in one frame. To calculate the period $\tau$, it is necessary to select a value for minimizing a value of E defined as $$E = \sum_{m=0}^{N-1} r^2(m) - \frac{\left[\sum_{m=0}^{N-1} r(m)r(m-\tau)\right]^2}{\sum_{m=0}^{N-1} r^2(m-\tau)} \quad \text{Equation (11)}$$

The pitch analysis and inverse filtering unit 230 performs pitch analysis and inverse filtering from the values calculated using Equation (10) and Equation (11), and outputs the result. The pitch analysis and inverse filtering result can be expressed as $$\hat{e}(k) = \hat{n}(k) + \hat{r}(k) \quad \text{Equation (12)}$$

The calculated value is input to the noise canceller 240, and processed in the method described above.

Figure 3:
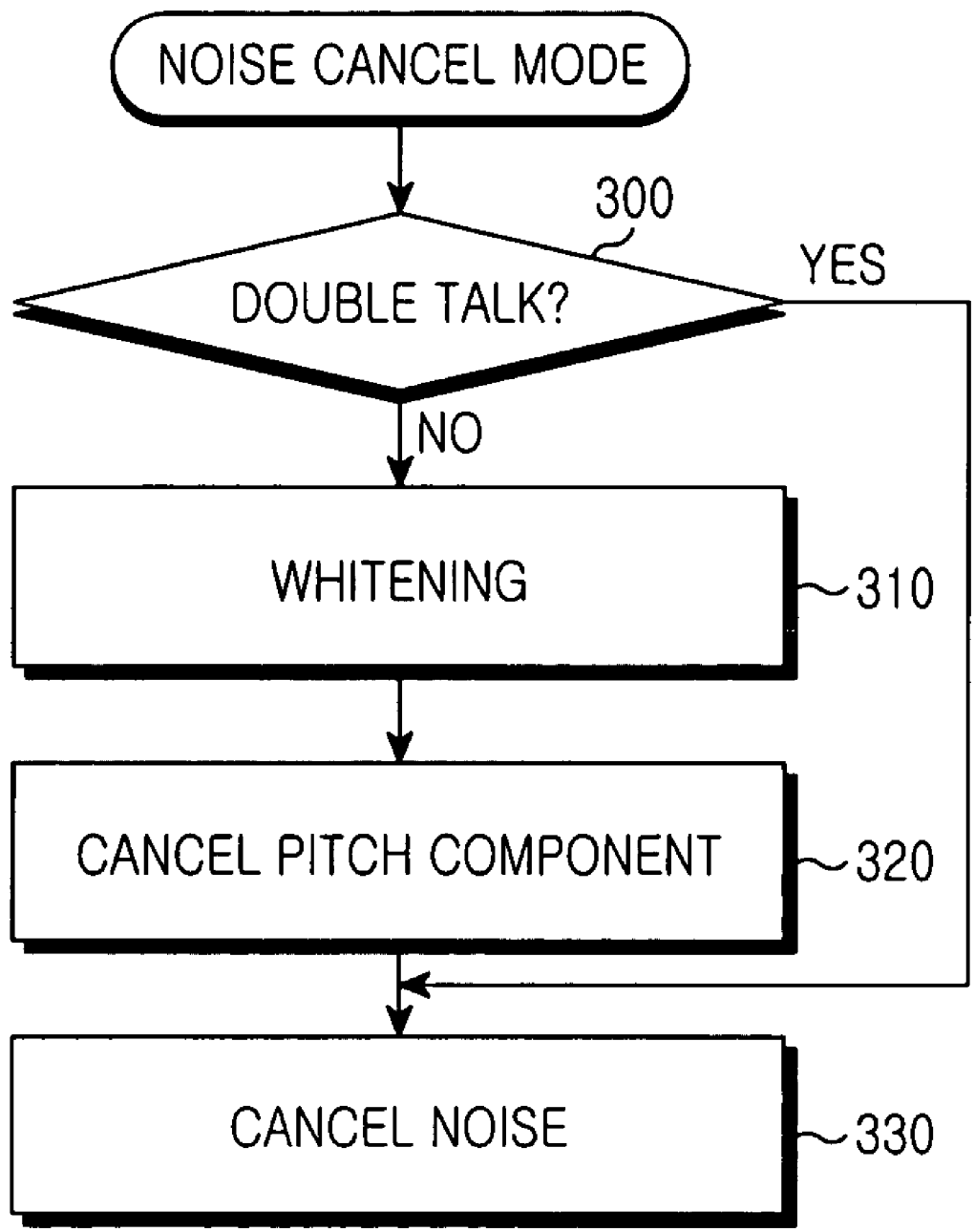
FIG. 3 is a flowchart illustrating a method for canceling a noise according to an embodiment of the present invention.

FIG. 3 is a flowchart illustrating a method for canceling a noise according to an embodiment of the present invention. With reference to FIGS. 2 and 3, a detailed description will now be made of a method for canceling a noise according to an embodiment of the present invention.

When the echo canceling apparatus enters a noise cancel mode, the DTD 210 receives an error signal e(k) output from the adder 140. Upon receiving the error signal e(k), the DTD 210 determines in step 300 whether there is a double talk. If it is determined in step 300 that there is a double talk, the DTD 210 proceeds to step 330 where it cancels a noise signal. However, if it is determined in step 300 that there is no double talk, the DTD 210 proceeds to step 310 where it outputs only the error signal e(k) in a received signal to the AR analysis and inverse filtering unit 220. Then the AR analysis and inverse filtering unit 220 performs an whitening operation in step 310 on the error signal e(k) in accordance with Equation (4). Thereafter, in step 320, the pitch analysis and inverse filtering unit 230 cancels a pitch value remaining in the whitened signal. The pitch-cancelled whitened signal is input to the noise canceller 240. In step 330, the noise canceller 240 cancels the noise based on the signal output from the DTD 210 and the signal output from the pitch analysis and inverse filtering unit 230.

In an alternative embodiment, step 310 can be skipped. This embodiment corresponds to the modified embodiment where the AR analysis and inverse filtering unit 220 is missing in FIG. 2. In this case, the error signal e(k) output from the adder 140 is input to the DTD 210. Upon receiving the error signal e(k), the DTD 210 determines in step 300 whether there is a double talk. If it is determined in step 300 that there is a double talk, the DTD 210 outputs the error signal e(k) to the noise canceller 240 through its first output terminal. Then the noise canceller 240 cancels the noise signal in step 330. However, if it is determined in step 300 that there is no double talk, the DTD 210 outputs a background noise n(k) and a residual echo signal e(k) to the pitch analysis and inverse filtering unit 230 through its second output terminal. Then the pitch analysis and inverse filtering unit 230, in step 320, cancels a pitch value remaining in the error signal e(k). The pitch-cancelled signal is cancelled by the noise canceller 240 in step 330.

As can be understood from the foregoing description, the echo canceling apparatus according to an embodiment of the present invention cancels an echo signal more accurately, thereby improving call quality.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for canceling an echo signal in a mobile terminal of a mobile communication system, the apparatus comprising:
    a double talk detector (DTD) for receiving an error signal including a background noise signal and a residual echo signal as a first signal, outputting the first signal as it is during a double talk, and outputting the first signal and a second signal made up of a background noise signal and a residual echo signal during a non-double talk;
    an Auto-Regressive (AR) analysis and inverse filtering unit for receiving the second signal from the DTD, and whitening the second signal;
    a pitch analysis and inverse filtering unit for receiving the whitened signal, and canceling a pitch value remaining therein by performing pitch analysis and inverse filtering on the whitened signal; and
    a noise canceller for receiving the pitch-cancelled whitened signal and the first signal output from the DTD, and canceling a residual echo signal and a background noise signal from the first signal using the pitch-cancelled whitened signal.

2. The apparatus of claim 1, wherein the AR analysis and inverse filtering unit whitens the residual echo signal and the background noise signal in accordance with the following equation (13);

$$w_e(k) = w_n(k) + w_r(k) \quad \text{equation (13)}$$

wherein $w_e(k)$ denotes a sum of a whitened signal of a background noise signal and a whitened signal of a residual echo signal, $w_n(k)$ denotes the whitened signal of the background noise signal, and $w_r(k)$ denotes the whitened signal of the residual echo signal.

3. The apparatus of claim 1, wherein the pitch analysis and inverse filtering unit cancels a pitch value remaining in the whitened signal in accordance with Equation (14), calculates a pitch gain coefficient β among factors of Equation (14) in accordance with Equation (15), and calculates a value for minimizing a value of E defined as Equation (16);

$$\hat{w}_r(k) = w_r(k) - \sum_{j=-i}^{l} \beta_j w_r(K - \tau - j) \quad \text{equation (14)}$$

$$\beta = \frac{\sum_{m=0}^{N-1} w_r(m)w_r(m-\tau)}{\sum_{m=0}^{N-1} w_r^2(m-\tau)}, \tau_{\min} \leq \tau \leq \tau_{\max} \quad \text{equation (15)}$$

$$E = \sum_{m=0}^{N-1} w_r^2(m) - \frac{\left[\sum_{m=0}^{N-1} w_r(m)w_r(m-\tau)\right]^2}{\sum_{m=0}^{N-1} w_r^2(m-\tau)} \quad \text{equation (16)}$$

wherein N denotes the number of samples in one frame, $\hat{w}_r(k)$ denotes a signal obtained by canceling a pitch value from a whitened signal, and K denotes a time-domain sample.

4. The apparatus of claim 1, further comprising:
    an echo canceller for receiving a remote-talker signal, and outputting an estimated remote-talker signal using the first signal; and a calculator for calculating a difference between a signal received from the microphone and an output signal of the echo canceller.

5. A method for canceling an echo signal in a mobile terminal of a mobile communication system, the method comprising the steps of:
    whitening a second signal made up of a background noise signal and a residual echo signal in a first signal including a background noise signal and a residual echo signal;
    performing pitch analysis and inverse filtering on the whitened signal, calculating a pitch value remaining in the whitened signal, and canceling the pitch value from the whitened signal; and
    canceling a residual echo signal and a background noise signal from the first signal using the pitch-cancelled whitened signal.

6. An apparatus for canceling an echo signal in a mobile terminal of a mobile communication system, the apparatus comprising:
    a double talk detector (DTD) for receiving an error signal including a background noise signal and a residual echo signal as a first signal, outputting the first signal as it is during a double talk, and outputting the first signal and a second signal made up of a background noise signal and a residual echo signal during a non-double talk;
    a pitch analysis and inverse filtering unit for receiving the second signal from the DTD, and canceling a pitch value included in the second signal by performing pitch analysis and inverse filtering on the second signal;
    a noise canceller for receiving the pitch-cancelled signal and the first signal output from the DTD, and canceling the background noise signal and the residual echo signal from the first signal.

7. The apparatus of claim 6, wherein the pitch analysis and inverse filtering unit cancels a pitch value remaining in a signal from which a local-talker signal is cancelled, in accordance with Equation (17), calculates a pitch gain coefficient β among factors of Equation (17) in accordance with Equation (18), and calculates a value for minimizing a value of E defined as Equation (19);

$$\hat{r}(k) = r(k) - \sum_{j=-i}^{I} \beta_j r(K - \tau - j) \quad \text{equation (17)}$$

$$\beta = \frac{\sum_{m=0}^{N-1} r(m)r(m-\tau)}{\sum_{m=0}^{N-1} r(m-\tau)}, \tau_{\min} \leq \tau \leq \tau_{\max} \quad \text{equation (18)}$$

$$E = \sum_{m=0}^{N-1} r^2(m) - \frac{\left[\sum_{m=0}^{N-1} r(m)r(m-\tau)\right]^2}{\sum_{m=0}^{N-1} r^2(m-\tau)} \quad \text{equation (19)}$$

where N denotes the number of samples in one frame, $\hat{r}(k)$ denotes a signal obtained by canceling a pitch value from a residual echo signal, and K denotes a time-domain sample.

8. The apparatus of claim 6, further comprising:
    an echo canceller for receiving a remote-talker signal, and outputting an estimated remote-talker signal using the first signal; and
    a calculator for calculating a difference between a signal received from the microphone and an output signal of the echo canceller.

9. A method for canceling an echo signal in a mobile terminal of a mobile communication system, the method comprising the steps of:
    extracting a second signal made up of a background noise signal and a residual echo signal from a first signal including a background noise signal and a residual echo signal, during a non-double talk;
    performing pitch analysis and inverse filtering on the extracted second signal, and canceling a pitch value remaining in the second signal; and
    canceling a residual echo signal and a background noise signal from the first signal using the pitch-cancelled second signal.

* * * * *